(12) United States Patent
Bouvet

(10) Patent No.: US 7,110,049 B2
(45) Date of Patent: Sep. 19, 2006

(54) PROCESS AND DEVICE FOR INSTALLING BROADCAST PROGRAMS

(75) Inventor: Philippe Bouvet, Saint Sulpice la Forêt (FR)

(73) Assignee: Thomson Licensing, Boulogne (FR)

( * ) Notice: Subject to any disclaimer, the term of this patent is extended or adjusted under 35 U.S.C. 154(b) by 460 days.

(21) Appl. No.: 10/202,327

(22) Filed: Jul. 24, 2002

(65) Prior Publication Data

US 2003/0027519 A1    Feb. 6, 2003

(30) Foreign Application Priority Data

Aug. 1, 2001    (FR)    .................................. 01 10423

(51) Int. Cl.
*H04N 5/38*    (2006.01)
(52) U.S. Cl. ..................................... 348/723
(58) Field of Classification Search ................ 348/723, 348/388.1, 423.1, 487; 370/468; 375/240.1, 375/316
See application file for complete search history.

(56) References Cited

U.S. PATENT DOCUMENTS

| | | | | |
|---|---|---|---|---|
| 4,821,120 | A | * | 4/1989 | Tomlinson ................. 348/727 |
| 5,003,395 | A | * | 3/1991 | Scheurs ....................... 348/726 |
| 5,454,009 | A | * | 9/1995 | Fruit et al. .................... 375/130 |
| 5,521,943 | A | * | 5/1996 | Dambacher ................. 375/295 |
| 5,604,746 | A | * | 2/1997 | Oto ............................. 370/481 |
| 5,835,493 | A | * | 11/1998 | Magee et al. .......... 370/395.62 |
| 5,859,664 | A | * | 1/1999 | Dent ............................ 348/21 |
| 5,870,674 | A | * | 2/1999 | English .................... 455/432.2 |
| 6,047,162 | A | * | 4/2000 | Lazaris-Brunner et al. 455/12.1 |
| 6,049,551 | A | * | 4/2000 | Hinderks et al. ........... 370/468 |
| 6,212,201 | B1 | * | 4/2001 | Hinderks et al. ........... 370/468 |
| 6,694,137 | B1 | * | 2/2004 | Sharon ....................... 455/427 |

FOREIGN PATENT DOCUMENTS

| | | |
|---|---|---|
| EP | 0999664 | 5/2000 |
| EP | 1001631 | 5/2000 |
| EP | 1043897 | 10/2000 |
| EP | 1119190 | 7/2001 |

OTHER PUBLICATIONS

B. Bringer et al. "ALCATEL 9740, An Efficient and Cost-Effective Solution for Low Density Communications Using SCPC, MCPC and DAMA in Satellite Networks", Electrical Communication, Alcatel, 1995, pp. 29-36.

* cited by examiner

*Primary Examiner*—Paulos M. Natnael
(74) *Attorney, Agent, or Firm*—Joseph J. Laks; Robert D. Shedd; Brian J. Cromarty

(57) ABSTRACT

The invention relates to a method of installing a bouquet of digital broadcast programmes on the basis of transponders of different minimum symbol frequencies. The frequency band is traversed using a quantization interval corresponding to the minimum symbol frequency of a transponder of a first type (MCPC). If a transponder of the said first type is found, the characteristics of the various transponders of first or of second type which are referenced in the said signaling table are extracted from its signaling table and the services associated with the various transponders are installed. If no transponder of the said first type is found, the said frequency band is traversed using a quantization interval corresponding to the minimum symbol frequency of a transponder of a second type so as to search for at least one transponder of the said second type and the services of each transponder of the said second type are installed.

7 Claims, 2 Drawing Sheets

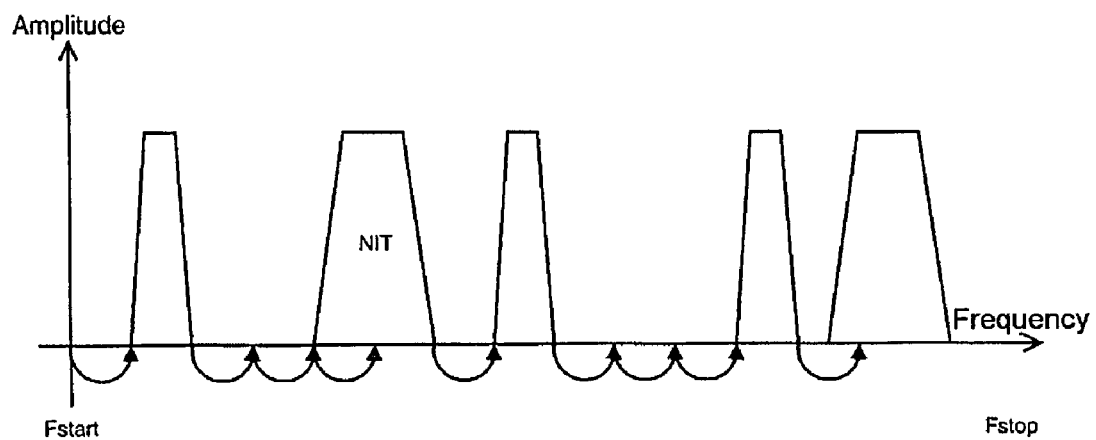
FIG 1 - PRIOR ART
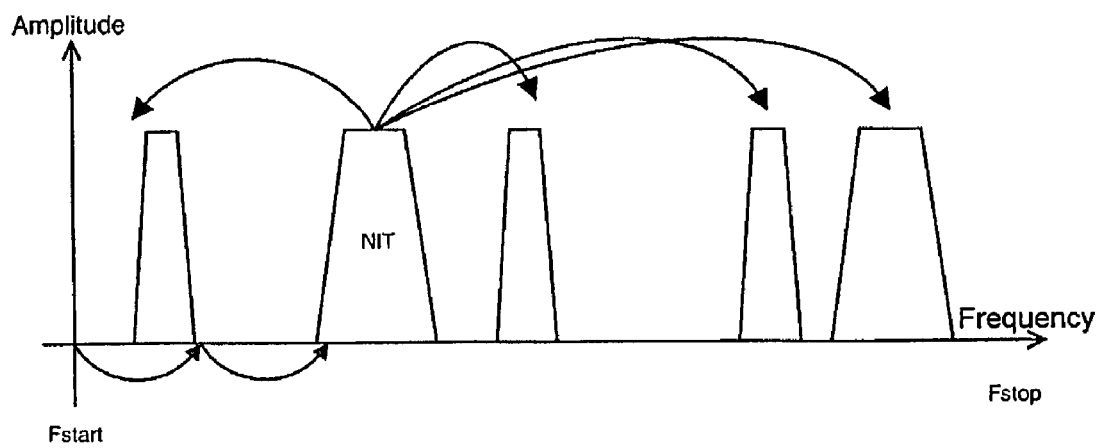
FIG 2

PROCESS AND DEVICE FOR INSTALLING BROADCAST PROGRAMS

The invention relates to a method and a device for installing digital broadcast programmes.

This application claims the benefit, under 35 U.S.C. 119, of French patent application no. 0110423 filed Aug. 1, 2001.

BACKGROUND OF THE INVENTION

The invention relates more especially to the field of audio and/or video digital reception systems complying with the DVB standard (the acronym standing for "Digital Video Broadcast").

The DVB standard is based on the audio and video MPEG-2 standard (the acronym standing for "Motion Picture Expert Group") and relates more especially to the transmission of MPEG-2 signals by satellite, by cable or by a terrestrial route.

The transponders used may be of the MCPC type (the acronym standing for "Multiple Channel Per Carrier") or of the SCPC type (the acronym standing for "Single Channel Per Carrier").

Transmission in MCPC mode allows the broadcasting of several audio and/or video channels on a single frequency by occupying the whole bandwidth of a transponder. In a transmission in SCPC mode, each programme uses a distinct frequency, the transponder being able to contain several frequencies.

The programme broadcasters can use various transponders to build their bouquet of programmes. Specifically, for cost reasons, certain broadcasters who do not have their own network, hire or purchase portions of frequency bands in order to build their bouquet of programmes. Certain programme bouquets therefore contain SCPC transponders and also MCPC transponders. For example, in the case of satellite reception, the band available thereon may be shared by several customers.

Various types of installation of programme bouquets exist. The installation which is simplest for a user is the blind scanning installation. This type of installation allows the user to disregard the signalling parameters which are necessary relative to more sophisticated installation processes. The time to install, under blind scanning, a bouquet on a reception apparatus, such as a set top box or a digital television, is inversely proportional to the sought-after data rate. In the case of the MCPC mode the data rates are of the order of from 15 to 40 Mbaud (mega baud) per second. The data rates in SCPC mode run between 2 and 15 Mbaud per second.

This explains why if an identical installation procedure is used, the time required for installation will be larger under SCPC than under MCPC.

The installation of a bouquet using MCPC and also SCPC transponders under blind scanning is very lengthy since it is necessary to traverse the entire frequency band using a frequency increment which corresponds to the capture span of the components effecting this installation. The latter being calculated on the basis of the smallest symbol data rate sought therefore corresponds within the framework of a mixed multiplex to an SCPC symbol data rate.

The installation of the various programme bouquets using SCPC and also MCPC transponders is therefore much more lengthy than the installation of programme bouquets comprising MCPC transponders only.

The invention therefore proposes to reduce the installation time for programme bouquets using SCPC and MCPC transponders.

BRIEF SUMMARY OF THE INVENTION

Accordingly, the invention proposes a method of installing a bouquet of digital broadcast programmes broadcast on a transmission medium, on the basis of transponders of at least two types whose minimum symbol frequency is different.

According to the invention, the frequency band is traversed using a quantization interval corresponding to the minimum symbol frequency of at least one transponder of a first type (MCPC), each of the said transponders of the said first type being associated with a signalling table (NIT), so as to search for at least one of the said transponders of the said first type (MCPC) contained in this frequency band, and if a transponder of the said first type is found,
  parameters of the various transponders of first or of second type which are referenced in the said signalling table are extracted from the signalling table (NIT) associated with the said transponder and,
  services associated with the various transponders referenced in the said signalling table are installed and,
if no transponder of the said first type (MCPC) is found in the said frequency band,
  the said frequency band is traversed using a quantization interval corresponding to the minimum symbol frequency of at least one transponder of a second type (SCPC) so as to search for at least one of the said transponders of the said second type contained in this frequency band and services associated with each transponder of the said second type contained in the said frequency band are installed.

Thus, the frequency band is rapidly traversed and the detection of a transponder of first type allows rapid detection of all the transponders present.

Moreover, contrary to certain known processes for installing digital programme bouquets, the user need not know the parameters of a transponder in order to install the bouquet of programmes, installation therefore being effected automatically and rapidly without user intervention.

The invention also relates to a device for installing a bouquet of digital broadcast programmes broadcast on a transmission medium, on the basis of transponders of at least two types.

According to the invention, the device comprises:
  means for traversing the frequency band using a quantization interval corresponding to the minimum symbol frequency of at least one transponder of a first type (MCPC), so as to search for at least one transponder of the said first type (MCPC) contained in this frequency band,
  a selection module, designed to select, in the case where the means for traversing the frequency band have found a transponder of the said first type:
    means for extracting, from the signalling table (NIT) associated with the said transponder, parameters of the various transponders referenced in the said signalling table (NIT) and,
    means for installing services associated with the various transponders referenced in the said signalling table, and the said selection module being designed to select in the case where the means for traversing the frequency band have not found any transponder of the said first type (MCPC) in the said frequency band:

means for traversing the said frequency band using a quantization interval corresponding to the minimum symbol frequency of a transponder of a second type so as to search for at least one of the said transponders of the said second type contained in this frequency band and means for installing services associated with each transponder of the said second type contained in the said frequency band, the said device being preferably adapted for implementing a method of installing a bouquet of digital broadcast programmes according to the invention.

The invention also relates to a computer program product, comprising program code instructions for executing the method according to one of the modes of implementation of the invention when this program is executed on a set top box or a digital television receiver.

The expression "computer program product" is understood to mean any medium of a computer program, covering not only recording media such as for example cassettes, discs or diskettes but also signals carrying this program.

BRIEF DESCRIPTION OF THE DRAWINGS

The invention will be better understood and other features and advantages will become apparent on reading the description of the exemplary embodiments based on satellite broadcasting which will follow, taken by way of nonlimiting examples with reference to the appended drawings in which:

FIG. 1 represents the way in which the frequency band is traversed according to the prior art, FIG. 2 represents the manner in which the frequency band is traversed according to the invention.

DETAILED DESCRIPTION OF THE INVENTION

Figure 3:
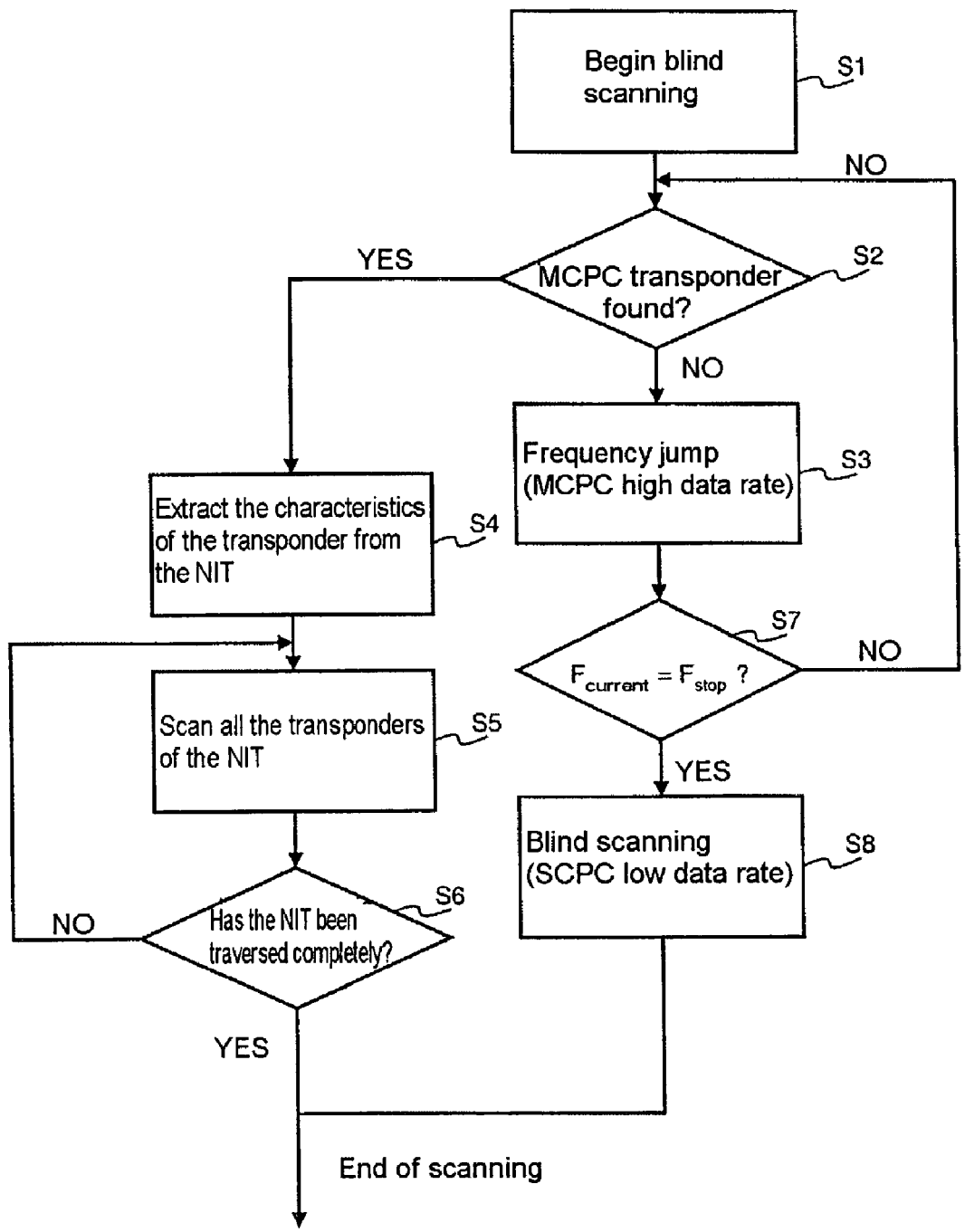
FIG. 3 represents a flow chart of the implementation of the invention.

FIG. 1 represents the manner in which the frequency band is traversed in the prior art.

The frequency band lying between $F_{start}$ and $F_{stop}$ is traversed using a quantization interval which corresponds to the symbol data rate of the transponders of SCPC type, so as to find all the transponders of both SCPC type and also of MCPC type in the frequency band. When a transponder is detected and installed, the frequency is automatically incremented by an offset corresponding to the width of the channel found. This is done so as to improve the scanning time. Once this adjustment has been performed, one restarts with an elementary interval of traversal corresponding to the smallest data rate sought.

In the case of the ISB (Intermediate Satellite Band) satellite band, we have:

$F_{start}$=950 Mhz
$F_{stop}$=2150 Mhz

To search for all the transponders present in the frequency band, in the case of a scanning type installation of a bouquet of programmes, the digital television or the set top box will traverse the frequency band so as to search for all the transponders. Scanning type installation allows the user to disregard the specifics of the signalling. When the programme bouquet comprises transponders of SCPC type and also of MCPC type, the installation of the programme bouquet requires fine scanning of the frequency span making it possible to detect the transponders of SCPC type. The frequency span scanning interval must therefore correspond to the lowest symbol data rate sought and hence to the smallest SCPC data rate.

In the case of an SCPC symbol data rate of 3 Mbaud, and of the band mentioned previously [950 Mhz–2150 Mhz], it is necessary to employ 8000 intervals in order to detect all the SCPC transponders whereas it is necessary to employ 800 intervals in the case of an MCPC symbol data rate of 30 Mbaud for a given version of reception components.

Moreover, the installation time also comprises waiting times for capture of the various reception stages. These waiting times are likewise inversely proportional to the data rates sought. They will therefore accentuate the difference in time necessary between an MCPC and SCPC installation.

It is therefore noted that it will be very lengthy to perform a search for all the transponders of a programme bouquet comprising transponders of SCPC and MCPC type. For one and the same digital television reception apparatus, the inventors have noted that installation of a programme bouquet comprising only transponders of MCPC type took around 2 minutes, whereas installation of a programme bouquet comprising transponders of both SCPC and MCPC type took around 2 hours.

FIG. 2 represents a traversal of the frequency band according to the invention.

The scanning of the frequency band is achieved using a scanning interval corresponding to the symbol data rate of an MCPC transponder. When an MCPC transponder is detected, its signalling table called NIT (the acronym standing for "Network Information Table") will be retrieved. This signalling table contains a list of the transponders associated with the transponder detected and included in the same bouquet of programmes. This signalling table furthermore comprises the information or parameters required for installing the various services. Thus, when a transponder is detected, the signalling table which is associated therewith advises as to the frequencies of the other transponders of the programme bouquet to be installed. It is therefore sufficient to take up position on these frequencies so as to install the various programmes, thereby avoiding the scanning of the entire frequency band as in the case of a scanning type installation.

The bouquets generally comprise at least one MCPC transponder so as to make it possible for example to perform an update of the software. This update having to be short, it requires a high data rate, hence an MCPC transponder.

FIG. 3 represents a flow chart of the operation of an apparatus implementing the invention.

In the course of step S1, the blind scanning of the frequency range is commenced. The scanning consists in searching for all the transponders corresponding to one or more data rates. In order to search for the various transponders, all the other parameters are varied automatically as a function of the transmission medium, which may be inter alia of satellite, cable or terrestrial type. For each frequency, the different parameters are varied and one sees whether a transponder is detected. When a transponder is detected, in step S2, we go to step S4. We then retrieve the signalling table commonly referred to as NIT. This table describes an entire bouquet of programmes, listing for each transponder their frequency as well as the other signalling parameters, this being so as to be able to retrieve all the services of a bouquet. These parameters in fact correspond to the parameters defined by the DVB SI standard (the acronym standing for Digital Video Broadcast Service Information).

The device according to the invention therefore comprises selection means which make it possible to select means for extracting, from the signalling table (NIT) associated with the transponder, parameters of the various transponders referenced in the signalling table (NIT) and means for installing services associated with the various transponders referenced in the signalling table.

The NIT therefore makes it possible to locate the various transponders, MCPC and SCPC, of the bouquet. In the course of step S5, the various transponders present in the signalling table are scanned and the services associated with these various transponders are installed if they are actually present. When all the transponders of the bouquet have been installed, step S6, installation is terminated.

When an MCPC transponder is detected, it and the transponders described in its NIT will be installed. Thereafter, the scanning will be continued by restarting on a frequency not incremented by the elementary interval but by a frequency corresponding to the top frequency of the transponder detected, incremented by this elementary interval so as to optimize the scanning time.

The same service can be detected on the basis of the installation of various SCPC transponders. In this case, a filtering with regard to the identifier of the service is performed so as to avoid installing it several times. This is done either in a binary manner, or by comparing the signal quality between the various transponders offering this same service.

If, in the course of step S2, that is to say at the first frequency of the frequency range, no MCPC transponder has been detected, we go to a higher frequency. The higher frequency corresponds to the base frequency $F_{start}$ incremented by an interval calculated on the basis of the symbol data rate of an MCPC transponder.

When the entire frequency band has been traversed and when no MCPC transponder has been found, step S7, we then traverse the frequency range by incrementing the frequency by an interval calculated on the basis of the symbol data rate of an SCPC transponder. In the course of this traversal, all the SCPC transponders detected are installed.

The selection means are therefore also designed to select in the case where the means for traversing the frequency band have not found any transponder of the said first type (MCPC) in the said frequency band:

means for traversing the said frequency band using a quantization interval corresponding to the minimum symbol frequency of a transponder of a second type so as to search for at least one of the said transponders of the said second type contained in this frequency band and means for installing services associated with each transponder of the said second type contained in the said frequency band.

What is claimed is:

1. A method of installing a bouquet of digital broadcast programs broadcast on a transmission medium, on the basis of transponders of at least two types whose minimum symbol frequency is different, wherein the frequency band is traversed using a quantization interval corresponding to the minimum symbol frequency of at least one transponder of a first type, each of the said transponders of the said first type being associated with a signaling table, so as to search for at least one of the said transponders of the said first type contained in this frequency band, and if a transponder of the said first type is found,
parameters of the various transponders of first or of second type which are referenced in the said signal-
ing table are extracted from the signaling table associated with the said transponder and, services associated with said transponder and with the various transponders referenced in the said signaling table are installed and, if no transponder of the said first type is found in the said frequency band, the said frequency band is traversed using a quantization interval corresponding to the minimum symbol frequency of at least one transponder of a second type so as to search for at least one of the said transponders of the said second type contained in this frequency band and services associated with each transponder of the said second type contained in the said frequency band are installed.

2. The method according to claim 1, wherein the minimum symbol frequency of the said transponders of first type is greater than the minimum symbol frequency of the said transponders of the said second type.

3. The method according to one of claim 1, wherein the transponders of the first and of the second type are respectively transponders of multiple channels per carrier type and of single carrier per channel type.

4. The method according to claim 1, wherein it is implemented in a set top box, a digital television, a digital video recorder or a digital DVD reader.

5. The method according to claim 1, wherein when a transponder is searched for in the frequency band, various parameters specific to the said transmission medium are varied, for each frequency, by combining them.

6. A device for installing a bouquet of digital broadcast programs broadcast on a transmission medium, on the basis of transponders of at least two types, wherein it comprises:

means for traversing the frequency band using a quantization interval corresponding to the minimum symbol frequency of at least one transponder of a first type, so as to search for at least one transponder of the said first type contained in this frequency band, a selection module, designed to select, in the case where the means for traversing the frequency band have found a transponder of the said first type;

means for extracting, from the signaling table associated with the said transponder, parameters of the various transponders referenced in the said signaling table and, means for installing services associated with said transponder and with the various transponders referenced in the said signaling table, wherein said selection module being designed to select in the case where the means for traversing the frequency band have not found any transponder of the said first type in the said frequency band means for traversing the said frequency band using a quantization interval corresponding to the minimum symbol frequency of a transponder of a second type so as to search for at least one of the said transponders of the said second type contained in this frequency band and means for installing services associated with each transponder of the said second type contained in the said frequency band, the said device being preferably adapted for implementing a method of installing a bouquet of digital broadcast programs.

7. The method of claim 1 wherein said program is executed on a set top box or a digital television receiver.

* * * * *